United States Patent [19]
Church

[11] 3,963,949
[45] June 15, 1976

[54] LAMINATED STRUCTURE WITH INSULATING MEMBER FORMED IN SITU THEREON

[75] Inventor: Ralph E. Church, Fort Wayne, Ind.
[73] Assignee: General Electric Company, Fort Wayne, Ind.
[22] Filed: Feb. 6, 1974
[21] Appl. No.: 439,895

Related U.S. Application Data

[62] Division of Ser. No. 301,162, Oct. 26, 1971, Pat. No. 3,813,763, which is a division of Ser. No. 99,049, Dec. 17, 1970, Pat. No. 3,709,457.

[52] U.S. Cl. .................................. 310/43; 310/71; 310/91; 310/179
[51] Int. Cl.² ........................................ H02K 1/04
[58] Field of Search ........... 310/40 MM, 42, 45, 43, 310/90, 91, 172, 179, 159, 217, 162, 163, 164, 166, 254, 259, 216, 180, 71, 194; 264/263, 272.5, 274; 336/196, 198, 192; 29/203; 317/99, 158

[56] References Cited
UNITED STATES PATENTS

| | | | |
|---|---|---|---|
| 3,024,377 | 3/1962 | Tupper | 310/172 |
| 3,060,335 | 10/1962 | Greenwald | 310/43 |
| 3,075,250 | 1/1963 | Strohm | 310/43 |
| 3,194,993 | 7/1965 | Hackney | 310/43 |
| 3,196,297 | 7/1965 | Kaeding | 310/40 MM |
| 3,270,227 | 8/1966 | Kaeding | 310/90 |
| 3,336,415 | 8/1967 | Kennedy | 310/45 UX |
| 3,438,122 | 4/1969 | Lindt | 310/45 |
| 3,484,860 | 12/1969 | Csaki | 310/43 |
| 3,766,416 | 10/1973 | Papst | 310/43 |
| 3,780,323 | 9/1971 | Swain | 310/43 |
| 3,829,720 | 8/1974 | Swanke | 310/43 |

FOREIGN PATENTS OR APPLICATIONS
759,960 5/1954 United Kingdom .................. 310/43

*Primary Examiner*—R. Skudy
*Attorney, Agent, or Firm*—Ralph E. Krisher, Jr.

[57] ABSTRACT

Winding accommodating laminated structures having insulating member formed in situ thereon and method and apparatus for making same. Insulating member may include winding retaining elements that are useful while arranging one or more windings on the structure and for maintaining the winding in a desired position on the structure. Insulating member may be used to secure individual laminations together and may include winding termination holding and protecting means. The overall dimension of the insulated structure is preselected and fixed for a given nominal lamination stack height and variations in dimensions that would otherwise occur due to variations in stack height is taken up or compensated for by the formation of a layer of insulating material having a correspondingly increased or decreased thickness. In one exemplification, auxiliary structural member is formed integral with an insulating member to provide mounting means having a predetermined relationship with stator laminations. In other embodiments, insulating material is formed around winding turns to substantially completely encase the turns with insulating material. In another embodiment, the auxiliary structural members may be pads, means for mounting elements such as carbon brushes, or means for mounting an inductive device to suitable supporting structure.

13 Claims, 30 Drawing Figures

LAMINATED STRUCTURE WITH INSULATING MEMBER FORMED IN SITU THEREON

CROSS REFERENCE TO RELATED APPLICATIONS

This application is a division of my copending application Ser. No. 301,162 which was filed Oct. 26, 1972 as a division of my then copending and allowed application Ser. No. 99,049, which in turn was filed Dec. 17, 1970. My application Ser. No. 99,049 issued as U.S. Pat. No. 3,709,457 on Jan. 9, 1973 and application Ser. No. 301,162 issued as U.S. Pat. No. 3,813,763 on June 4, 1974. The entire disclosures of the just referenced applications are specifically incorporated herein by reference.

BACKGROUND OF THE INVENTION

This invention relates in general to electrical devices including one or more wound coils and more particularly to devices of this type which are provided with an insulating member supported on a laminated winding accommodating structure. The invention is more particularly and concisely described in connection with electric motors.

Many fractional horsepower, relatively low cost, electric motors are conventionally formed with a generally U-shaped laminated yoke section having a rotor receiving bore in the bight portion of the U as described for example in the Myron D. Tupper U.S. Pat. Nos. 3,014,140 and 3,024,377 which issued on Dec. 19, 1961 and Mar. 6, 1962 respectively, and which are assigned to the assignee of this application.

Since the general types of motor construction described in the Tupper patents are now known in the art, further detailed description of the general features and characteristics of such motors will not be specifically set forth herein; and the disclosure of such Tupper patents are specifically incorporated herein by reference.

It is generally recognized that it is necessary to provide means for insulating a motor winding formed of one or more coils from the winding accommodating structure of the motor. Various approaches and techniques used in the past have included the placement of an insulating material around selected portions of the coil accommodating structure and have, at times, included means for positioning the coil turns on the coil accommodating structure. Another approach suggested heretofore in Great Britain Patent 759,960, involves the formation of insulation in situ on, e.g., a salient pole shaded pole stator core. That publication, however, neither recognized problems associated with such an approach nor suggested solutions to such problems.

In the case of the motors shown and described in Kaeding U.S. Pat. No. 3,270,227 (issued Aug. 30, 1966) "integral insulation" may be placed on the winding accommodating structure to provide a ground insulation system. Suitable thermosetting resins may also be used to form a covering for the winding, provide an outer insulation system for the winding, and also firmly and fixedly position the winding on the coil accommodating structure. These approaches, however, do not make it possible to economically provide auxiliary structural members that are formed of insulating material.

In still other approaches, the ground insulation may be formed by insulating tape or by a hardened coating of thermoresponsive material that is applied by brushing or dipping. All of these approaches have turned out to be relatively expensive in actual practice.

In each of the above-mentioned approaches, some means be provided to secure together a stack of laminations at least until the ground insulation has been permanently formed on the lamination stack. Frequently, weld beads or rivets have been used for this purpose. This in turn has contributed to increased manufacturing expense and, in general, has contributed to increased core losses during motor operation.

Still another approach that has been used heretofore (in fractional horsepower sized motors) has included the use of a coil bobbin made of one, two, or more molded parts that are assembled together on an elongated stack of laminations. Wingler et al U.S. Pat. No. 3,189,772 which issued June 15, 1965 illustrates one of these approaches.

The use of preformed insulating bobbins or bobbin parts are often desirable for economic reasons, but this approach too is not completely satisfactory. When lamination stacks are formed from laminations having non-uniform sections, as for example, by having enlarged end sections or enlarged sections intermediate the ends of the laminations (as clearly revealed for example in the aforementioned Tupper U.S. Pat. No. 3,024,377), use of a bobbin with a sleeve having a bore passable over the enlarged sections results in the formation of large air gaps between the lamination stack and bobbin. This, in turn, decreases the heat transfer rate from the winding to the lamination stack and reduces the magnetic flux density induced in the laminations during energization of the winding.

Furthermore, even when generally rectangular shaped laminations are used to form the coil accommodating structure of the motor (as suggested for example in the Wingler et al patent), air gaps between the core and bobbin still occur due to the tolerances that must be provided to assure that a bobbin may be readily assembled on a laminated core. This problem is aggravated by the relatively great variations that occur during manufacture of a laminated core and particularly so in those cases where laminations are bonded together. This approach is also expensive since the bobbins must be preformed, handled, and then assembled on the stack of laminations.

Furthermore, some means should normally still be used to secure the laminations together prior to slipping the bobbin thereon. For example, after a bobbin is slipped onto a stack of laminations, some means such as an adhesive or varnish applied by varnish treatment is used to secure the bobbin to the lamination stack.

Varnish or insulating tape has also often been depended upon to provide protection for the winding. It would, however, be desirable to provide an electric motor wherein the winding portion of the motor is substantially completely surrounded by a moisture resistant molded structure.

Although the above problems have been discussed with particular reference to fractional horsepower motors, it will be appreciated that these problems may also be encountered in the manufacture of other devices. Thus, it will be seen that the resolution of these and other problems would be particularly desirable.

SUMMARY OF THE INVENTION

Accordingly, it is an object of the present invention to provide an improved motor construction wherein an insulating member is provided in intimate engagement with selected surfaces of a winding accommodating portion of a stack of laminations and wherein the thickness of the insulating member along a predetermined portion of the lamination stack is related to and dependent on the difference between the actual height of the stack and a predetermined nominal stack height.

It is another object of the present invention to provide an improved construction wherein a winding accommodating stack of magnetizeable stator laminations is provided with an insulating member intimately engaging selected surfaces of the stack and wherein an auxiliary structural member is formed integral with the insulating member to provide mounting means having a predetermined relationship with the stator laminations.

Still another object of the invention is to provide an improved construction wherein a stack of laminations having a height within a predetermined range of heights has an insulating member secured thereto in intimate engagement therewith.

Yet another object of the present invention is to provide an improved magnetic assembly for an electric motor that is economical to manufacture and wherein the assembly includes a stack of winding accommodating laminations having an insulating member formed in situ thereon; a winding disposed against the insulating member; and a secondary insulating member molded about the winding to seal the same.

A further object of the present invention is to provide an improved structure wherein a stack of laminations having a stack height within an economically obtainable stack height range is provided with a formed in situ insulating member having a wall with a thickness for compensating for stack height variation in a particular stack of laminations.

In carrying out the above and other objects of the invention in one form, I provide a winding accommodating structure that includes a winding accommodating stack of magnetic laminations with an insulating member formed in situ thereon and in intimate engagement with selected surfaces of the lamination stack. As used herein, "winding" is meant to include one or more coils, each having one or more turns of an electrical current carrying conductor, and "winding accommodating" is meant to describe a structure that may be used to support or otherwise accommodate one or more windings whether connected in series or parallel and whether one or more windings are or are not inductively coupled.

In the preferred form, now to be briefly described and wherein many of the advantages of the present invention are sought, a stack of laminations has an irregular shape or configuration and is held in assembled relation with a formed in situ insulating member. Furthermore, the insulating member includes auxiliary structural means in the form of a pair of "sideboards" or flanges for maintaining a winding in a desired position on the structure. Both of the flanges include at least one receptacle for receiving and protecting winding terminations.

The overall dimension of the insulated structure is fixed, and the thickness of insulating material adjacent one end lamination is fixed. The lamination stack height, however, is a variable from stack to stack, and the thickness of insulating material adjacent the other end lamination compensates for the deviation of lamination stack height from a preselected maximum permissible stack height.

One method that may be used for forming an insulating member in situ adjacent to selected surfaces of a stack of winding accommodating laminations includes: positioning a stack of laminations in a mold cavity; and compressively holding the stack against a locating surface or abutment with a force preselected for that purpose, while holding closed cavity defining mold members together with a mold closing force that is substantially independent of and isolated from the compressive force applied to the stack of laminations within the mold cavity. Thereafter unhardened insulating material is moved into the closed cavity and hardened, after which the stack of laminations and an insulating member formed in situ thereon are removed as a unitary structure. Apparatus that may be used includes, in one form, a mold including a plurality of mold parts which are relatively movable to define a closed cavity and power means for opening and closing the mold. Also provided are means for locating a stack of laminations having a stack height within a predetermined range of stack heights. The mold also includes means for compensating for variations in stack height that accommodate the cavity to a stack of laminations located therein. In one form this means substantially isolates a stack within the cavity from the mold closing forces and includes a plurality of stack holding or clamping elements that are interconnected through a lost motion connection to one of the mold parts. Relative movement between a mold part and one or more of such elements may occur because of such lost motion connection. such relative movement is related to the actual height of given cores and, in preferred approaches, more movement occurs for stacks having actual heights less than nominal, and vice versa.

In accordance with another embodiment of the invention, an insulated core having winding turns thereon has insulating material provided therearound to substantially completely encase the winding turns with insulating material.

In still other embodiments, the molded in situ insulating member or subsequently molded material is formed to include auxiliary structural members. These members may be mounting means in the form of pads for supporting the wound core; in the form of means for mounting elements such as carbon brushes; or other desired means.

BRIEF DESCRIPTION OF THE DRAWINGS

For a better understanding of the invention, reference may be had to the accompanying drawings wherein like reference numerals have been used to denote identical parts.

FIGS. 17 through 18 schematically illustrate apparatus; and, more particularly.

DESCRIPTION OF THE PREFERRED EMBODIMENTS

Figure 1:
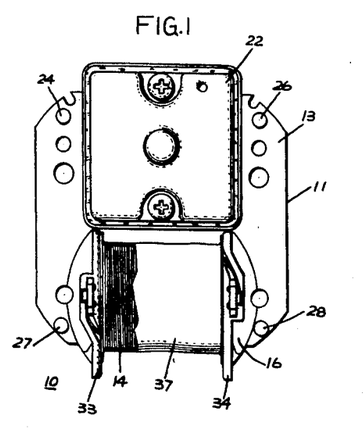
FIG. 1 is an elevational view, with parts broken away, of an electric motor embodying my invention in one form.

Referring now to FIG. 1 of the drawings, for purposes of illustration I have shown an electric motor 10 of the shaded pole type for the purpose of describing one preferred exemplification of the invention. The motor 10 conventionally includes a stator 11 and rotor 12, with the rotor being positioned between a pair of oppositely disposed pole faces provided on a main yoke section 13 of stator 11. As will be understood, the rotor is activated during operation by means of magnetic flux which is provided upon excitation of an electrical winding 14 which is supported on a stack of coil accommodating magnetic laminations which, for purposes of illustration, have been shown as a core section 16 of the stator 11.

At the beginning of operation of the motor 10, magnetic flux passes through the yoke section 13 and between the pole faces. Suitable shading coils (for example, coil 17) are provided at the trailing ends of the stator pole faces, and affect, in known fashion, starting torque and running torque of the motor.

End frames or brackets 18, 19 support suitable bearings for opposite end portions of a rotor shaft 21. The bearings may be advantageously formed as described for example in Baclawski U.S. Pat. No. 3,168,663 but are hidden in FIGS. 1 and 2 by oil covers 22, 23.

Figure 2:
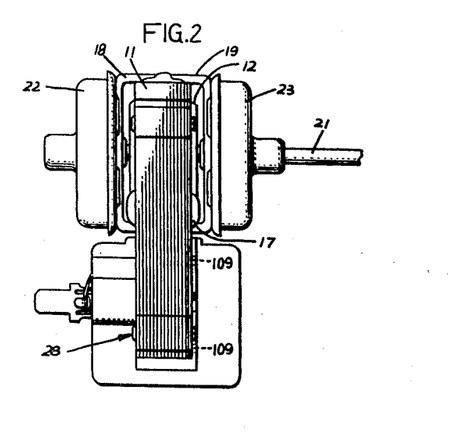
FIG. 2 is a side view of the motor in FIG. 1.

The rotor includes a squirrel-cage winding carried by suitable slots in a laminated core and the main yoke section 13 of the stator is comprised of a stack of magnetic laminations held together by any suitable means such as, for example, rivets 24, 26, 27, 28 as shown in FIGS. 1 and 2. Other structural details of the motor 10, not now specifically described are as in the aforementioned Baclawski patent. Accordingly, the disclosure of U.S. Pat. No. 3,168,663 is incorporated herein by reference.

As will be appreciated by now referring to FIGS. 3 through 7 in conjunction with FIGS. 1 and 2, the winding accommodating structure used in the formation of core section 16 includes an insulating member formed in situ on a stack of winding accommodating laminations and in intimate engagement with selected surfaces of the stack of laminations. In the exemplification, this insulating member 30 includes a body portion 31 intimately engaging the surfaces of the stack of laminations 32 adjacent thereto. This results in improved heat dissipation from the winding and improved leakage current characteristics as will be set forth in more detail in the concluding portion of this specification. The member 30 also includes a pair of projecting elements, illustrated as sideboards or flanges 33, 34, which may include one or more winding termination receiving portions or receptacles as illustrated for example at 35, 36.

The flanges 33, 34 also provide means for retaining the winding 14 in a desired position upon the core section 16. Further, it will be understood that one or more additional flanges may also be provided to separate two or more windings, e.g., when a transformer winding is arranged on a core section with a motor winding. In the motor 10, after placement of the winding on the core section 16, means in the form of electrical insulating tape 37 are used to protect the outer turns of the winding.

Figure 3:
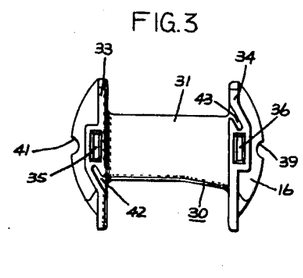
FIG. 3 is a view of a winding accommodating stack of laminations with an in situ formed insulating member that may be used in the manufacture of the motor shown in FIG. 1.
Figure 4:
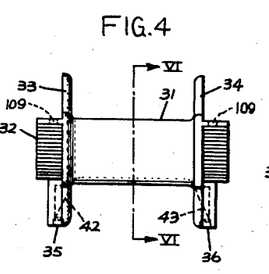
FIG. 4 is an elevational view of the structure shown in FIG. 3.
Figure 5:
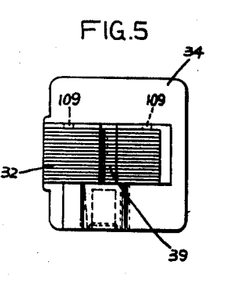
FIG. 5 is an end view of the structure shown in FIG. 4.

One advantage, among others, associated with the FIG. 3 structure is the elimination of rivets, welds, or other fasteners for holding the laminations 32 together as an assembled stack. This results because the formed in situ insulating member 30 serves as a fastening means for holding the laminations 32 together.

In addition to eliminating the labor involved in welding or securing rivets to stacks of laminations, use of the insulating member 30 as a stack fastening means also eliminates the need to reduce the effective magnetic cross-section of a laminated core that would result by providing rivet holes or alignment keyways along or through the lamination stack. Thus, when utilizing the advantage of securing the lamination stack together with the insulating member 30, the magnetic flux carrying capacity of a given lamination will be improved as compared to performance of the same stack with rivet holes therethrough.

To provide a basis for evaluating the last mentioned advantage, a study has been made of the saturation characteristics of a core section constructed corresponding to the structure 16 illustrated in FIGS. 3–6; a similar structure with rivet holes therein; and still another structure arranged according to prior practice.

In structures corresponding to the FIG. 3 exemplification, a stack of laminations 32 were assembled with a stack height of approximately one-half inch. Iron laminations were used, each having a thickness of about 0.025 inches. The winding in this test structure comprised 1800 turns of 0.0080 inch diameter copper wire. No rivet holes were formed in the laminations and a formed in situ insulating member held the stack together. Test data for this type of structure is presented in the column identified as "Type III" in Table I below.

The column identified as "Type II" in Table I contains data corresponding to data empirically obtained for a construction similar to the Type III structure with the exception that two rivet receiving passageways approximately ⅛ inch in diameter were provided in the ½ inch lamination stack. These passageways extended through the stack and were spaced approximately 1 inch apart and about ½ inch from the alignment ways corresponding to ways 39, 41 shown in FIG. 3.

A formed in situ insulating member similar to member 30 was used to secure together the Type II lamination stack, and the structure was wound with 1800 turns of 0.0080 inch diameter copper wire.

Data for still another type of construction, referred to as "Type I" in Table I below was obtained. In this arrangement, a one half inch stack of laminations similar to the Type II stack were secured together with approximately ⅛ inch diameter steel rivets so that the rivet holes were essentially filled with ferromagnetic material. This stack of laminations was then provided with an "integral insulation" coating as taught heretofore. Thereafter, a winding similar to the windings provided for the Type III and Type II test specimens was placed on the Type I devices.

In order to avoid variations during testing, a special magnetic structure was used to form a continuous magnetic circuit through the core sections. This special magnetic structure comprised a ½ inch stack of generally C-shaped laminations with which each test stack was assembled during testing in order to avoid variable results that might otherwise have occurred due to variations between rotors, rotor to stator air gap, and stator variations in an actual motor construction.

The tests were performed as follows: For each test set up, one of the wound core sections was assembled with the special magnetic test structure and the ends of the winding were connected to a 60 Hz source. Four different levels of voltage were applied and the amount of power input to the coils, measured in watts, was measured for each voltage. The test voltages were 90 volts, 115 volts, 130 volts, and 140 volts. Several readings were taken and the power input data recorded for each of the wound structures being tested. The recorded data was then plotted as points of a graph and curves fitted to the plotted points with voltage as the ordinate and watts input as the abscissa on the graph. Readings taken from these curves for voltage values of 90, 115, 130, and 140 are presented below in Table I.

Table I

| Applied Voltage at 60 Hz (volts) | Power Input (watts) | | |
|---|---|---|---|
| | Type I | Type II | Type III |
| 90 | 1.15 | 1.05 | 1.00 |
| 115 | 1.95 | 1.90 | 1.65 |
| 130 | 2.8 | 3.25 | 2.25 |
| 140 | 3.75 | 5.50 | 2.75 |

Since the above data was obtained using a special magnetic circuit, it will be understood that the data cannot be exactly compared to actual motor performance. However, the data is believed to accurately represent the relative saturation characteristics of motors embodying the present invention in a preferred and alternate form, and of motors of conventional form utilizing Type I structures.

From a review of the Table I data, it will be appreciated that, when the invention is embodied in a preferred form (Type III), less watts input would be required, for the approximately same flux density in the magnetic circuit, than would be required with a more conventional Type I construction. In other words, with all other variables held constant, the Type III arrangement would result in more efficient operation.

Furthermore, for 115 volt and lower operating voltage levels, Type II constructions, with a restricted flux path, appear to be as efficient in operation as a conventional Type I riveted arrangement. It is believed that this results because the effect of the restricted flux path in the Type II construction is offset by eddy current losses in the rivets and internal stresses caused by riveting which affect the hysteresis characteristics of the Type I cores.

Although termination receiving means in the form of termal receptacles 35, 36 have been shown in the preferred embodiment as illustrated for example in FIGS. 1 through 7, such receptacles may be omitted and the ends of the coils connected in a conventional fashion. For example, the ends of the coils may be connected by soldering or otherwise connecting the winding leads to external lead wires. However, when terminal receiving receptacles are provided, it is also desirable to provide winding lead accommodating passageways as illustrated at 42, 43. The inner winding leads may then be disposed in these passageways in a manner (as will be understood by persons skilled in the art) to avoid contact between the innermost winding lead and the outer layers of winding turns.

In addition to eliminating the need and expense of rivets or other fasteners, a formed in situ insulating member provides the further advantage of eliminating the relatively great expense of inspection and repair of integral insulation coatings. As compared with preformed winding bobbins, a formed in situ insulating member also eliminates the necessity of handling separate preformed bobbin elements. In the case of "dog bone" shaped laminations 32, the need to use separate sideboards is also eliminated. Furthermore, the formed in situ insulating member 30 intimately engages selected surfaces of the stack of laminations 32 (thus eliminating bobbin to core air gaps) and removes laminations stack height as a critical manufacturing dimension.

In fact, as will be described more completely hereinafter, lamination stacks that are stacked to within only about plus or minus one lamination thickness of a nominal stack height may be economically utilized in the practice of the invention.

Figure 6:
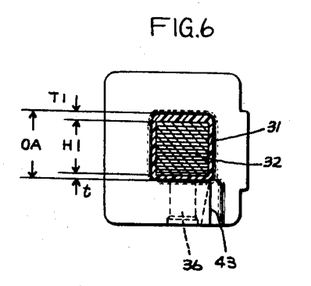
FIG. 6 is a sectional view, taken along lines VI—VI in FIG. 4.
Figure 7:
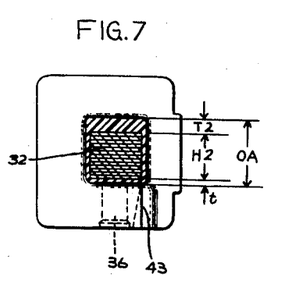
FIG. 7 is a view similar to FIG. 6 and differing therefrom in that the stack height of the winding accommodating laminations is less than the stack height of the winding accommodating laminations of FIG. 6.

A permissible range in stack heights of laminations, which each nominally are about 0.025 of an inch thick, is quickly revealed by a comparison of FIGS. 6 and 7. In these figures, the overall dimensions OA of an insulated winding accommodating structure is preselected and fixed. Furthermore, the minimum desired insulation thickness for a given insulating material is also fixed. However, the actual stack height of a stack of laminations for a given nominal stack height arrangement may vary within a range of heights wherein the permissible range between upper and lower stack height limits is preferably slightly more than two laminations thicknesses.

FIG. 6 illustrates a stack with an actual stack height H1 and an insulation material wall of thickness T1 that is at least equal to the minimum desired insulation thickness $t$.

It will be appreciated from an inspection of FIG. 6 that the actual insulation wall thickness T1 (measured along a line of measurement in the plane of FIG. 6 and across the stack of laminations) is substantially equal (i.e., with normal measurement error) to the overall dimension OA minus the sum of the preselected thickness $t$ and the actual stack height H1.

Furthermore, the actual insulation wall thickness along the same line of measurement is substantially equal to a preselected design thickness plus the difference between the actual stack height of the lamination stack and a predetermined maximum permissible stack height. In the special case of the FIG. 6 structure, the stack height H1 of the lamination stack has been illustrated as being about equal to the maximum permissible stack height and, accordingly, the difference therebetween would be about zero.

In FIG. 7, the actual lamination stack height H2 was selected to approximtely represent a minimum acceptable stack height. Therefore, H2 would represent the lower limit of an acceptable stack height range. In this example, the thickness T2 of the insulation wall along a vertical line of measurement in FIG. 7 would be near a maximum designed value. However, the relationships between the measurements H2, T2, OA, and $t$ would remain the same as the relationships set forth above between the measurements H1, T1, OA and $t$ shown in FIG. 6. It should now be understood that, by establishing and maintaining these dimensional relationships, a group of laminations having a stack height approximating a nominal desired stack height may be quickly stacked together. Thus, the expense that would be associated with attempting to stack a fixed predetermined number of laminations to a precision stack height may be eliminated.

The manner and method by which preferred arrangements may be quickly and economically accomplished in practice will be discussed hereinafter in more detail in connection with FIGS. 17 through 22 of the drawings but first, a brief description will be presented of the structural arrangements shown in FIGS. 8 through 16.

Figure 8:
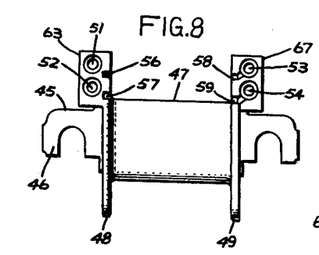
FIG. 8 is a view of another stack of winding accommodating laminations with an insulating member formed in situ thereon.
Figure 9:
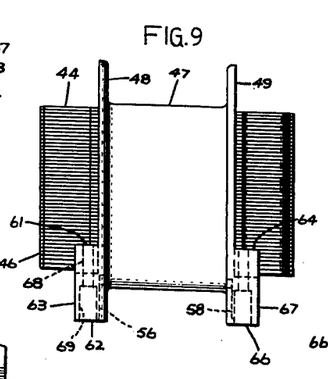
FIG. 9 is an elevational view of the structure shown in FIG. 8.
Figure 10:
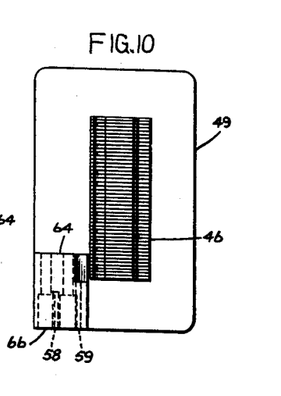
FIG. 10 is an end view of the structure of FIG. 9.

Turning now to FIGS. 8 through 10, a stack 44 of laminations 46 having a generally rectangular configuration rather than a dog bone configuration are shown with an insulating member formed in situ that includes a ground insulation segment 47, and a pair of sideboards 48, 49. Each of the sideboards includes receptacles for receiving the ends of winding leads and external leads connected thereto. These receptacles are identified by the reference numerals 51, 52, 53 and 54. Also included are coil lead receiving passages or slots 56 through 59 which may be used for the same purpose as the passageways or slots 42, 43 in FIG. 3.

The receptacles 51 through 54 are provided with different sized openings at opposite end surfaces 61, 62 of termination block 63 and ends 64, 66 of termination block 67. For example, the receptacle 51 is shown as having a first diameter along a first segment 68 thereof. The receptacle 51 also has a second, larger diameter along a second segment 69 thereof. It should be appreciated, however, that the intended result could also be accomplished by providing a smoothly tapered internal receptacle surface. By providing the receptacles with a differing configuration as viewed at either end of the termination blocks, the receptacles and blocks can be used to provide mechanical stress relief means for the connection between a winding lead and external lead.

For example, an external lead may be introduced through the portion 61 of the receptacle 56 and pulled through the larger portion 69 of the receptacle. The external lead may then be connected by a conventional solder joint or crimped connector to a winding lead. The connection would then be pulled back into the region 69 and, as the connection encountered the constricted part of the receptacle passagway, the connector and external lead would be held in place and the winding lead relieved from stresses that would otherwise be imparted by pulling on the external lead.

Although only four termination receptacles have been illustrated in FIGS. 8 through 10, three or more receptacles could be provided in the vicinity of each corner of each of the sideboards 48, 49. This could be done in order to accommodate at least 24 separate winding connections. This could be useful, for example, when the stack of winding accommodating laminations are utilized as the core section of a multi-speed motor which utilizes a plurality of winding sections. Other uses would be with the core section of a transformer or combination transformer-motor of the type used, for example, as combination drive motors and lamp energization means in some movie projectors.

Figure 11:
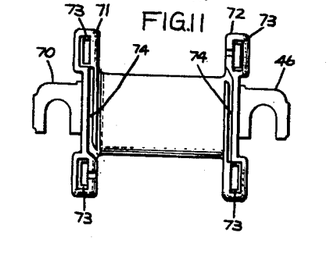
FIG. 11 is a view of still another stack of winding accommodating laminations with an insulating member formed in situ thereon.
Figures 12, 13:
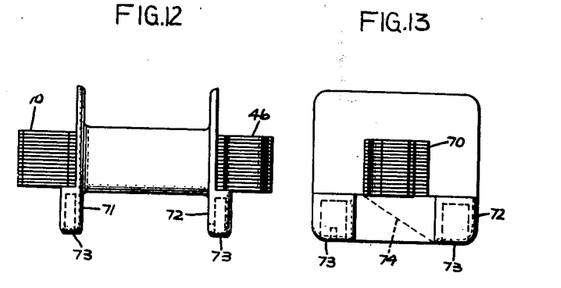
FIG. 12 is an elevational view of the structure shown in FIG. 11.
FIG. 13 is an end view of the structure of FIG. 12.

Turning now to FIG. 11, still another embodiment is illustrated wherein a stack 70 of laminations substantially identical to the laminations 46 of FIGS. 8 through 10 are arranged with an insulating member formed in situ thereon. The insulation member includes sideboards 71, 72 with termination receptacles 73 and winding lead passageways 74.

Figures 14, 15, 16:
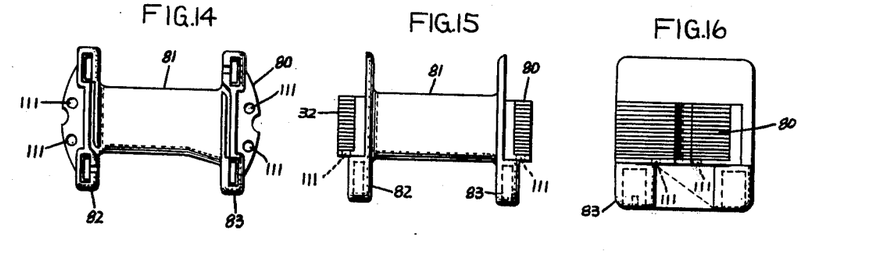
FIG. 14 is a view of yet another structure including a stack of winding accommodating laminations and a formed in situ insulating member.
FIG. 15 is an elevational view of the structure shown in FIG. 14.
FIG. 16 is an end view of the structure of FIG. 15.

In FIGS. 14 through 16, a stack 80 of individual laminations substantially identical to the laminations 32 shown in FIGS. 1 through 7 are shown. The stack 80 is provided with an in situ formed insulating member having a first section 81 intimately engaging selected surface portions of the stack 80. The section 81 both secures the stack 80 together and provides a dependable and economical ground insulation member. Also included as part of the insulating member are flanges 82, 83 with termination receptacles and passageways similar to the receptacles and passageways 73, 74 in FIGS. 11 through 13.

In each of the above described embodiments, an insulating member is formed in situ and need not include winding locating means (illustrated for example as sideboards). Furthermore, in each of the embodiments, the illustrated stack of laminations has an actual stack height within a preselected range of stack heights. The thickness of at least one wall of the insulating member is a variable and is actually established during manufacture so as to maintain a preselected overall height for the insulated winding accommodating structure.

A formed in situ insulating member has also been used in each of the embodiments to secure a stack of laminations together without the use of other stack fastening means. However, additional stack fastening means could be used if desired.

By forming the insulating member in situ, various relationships that have heretofore been considered to be critical but expensive to maintain (such as the relationship of lamination stack height to a preformed bobbin bore dimension), have been eliminated. Still another advantage will now be understood to be the ease with which an insulating member having wide variations in shapes and sizes may be formed in situ on a lamination stack.

The present invention facilitates the attainment of substantially all of the advantages that have previously been associated with the use of preformed insulating bobbins while virtually eliminating the disadvantages associated therewith. Moreover, the advantages associated with formed insulating members may now be realized in structures made up with irregular, e.g., dog bone shaped, laminations.

Turning now to FIGS. 17–22, there will be described both a method and apparatus that may be used to attain the benefits of my invention. In a preferred method and with the illustrated apparatus, a stack of 88 of laminations 32 is placed into molding apparatus 90, and an insulating member having a predetermined desired configuration is formed in situ around the stack 88 in a closed cavity defined by the molding apparatus.

Figure 17:
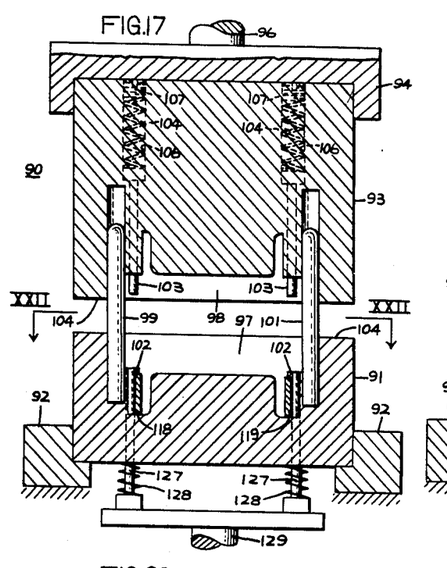
FIG. 17 is a mechanical schematic view, partly in section, of apparatus that may be used to form the structures shown in FIGS. 3–7.

As shown in FIG. 17, the apparatus 90 includes a lower mold part 91 supported upon a suitable base 92, an upper mold part 93, and power means which include a press head 94 powered through rod 96 by suitable means such as a not shown hydraulic cylinder so as to open and close the mold parts 91 and 93. The mold parts 91, 93 define a closed cavity region. When the parts 91, 93 are held together, the spaces 97, 98 form a closed cavity.

During operation of the apparatus 90, the head 94 raises the mold part 93 from the mold part 91 and a stack 88 of laminations having a stack height within a preselected stack height range are dropped between lamination alignment pins 99 and 101 with the locating ways 39, 41 (best shown in FIG. 3) cooperating with the pins 99, 101 to align the laminations on the mold part 91.

The laminations then rest against abutment means which include the locating surfaces 102. In the apparatus shown, this resulted in the lower insulation wall having a thickness of about 0.032 inches (corresponding to dimension $t$ in FIG. 6) which has been found to be satisfactory when nylon is used as the insulating material. The spatial relationships of these parts will be most readily understood by referring to FIG. 17 in conjunction with FIG. 22.

After placing a lamination stack in the apparatus 90, the upper mold part 93 is closed against the lower mold part 91 with a preselected force, and the surfaces 104 nest against one another to prevent the undesired escape of insulating material from the closed cavity.

In the manufacture of the FIG. 3 insulated structure, the mold parts were held closed by a 30 ton press while an unhardened polyamide resin at a temperature of about 580°F. was moved under a pressure of about 12,000 psi into the closed cavity. More specifically, the resin was a commercially available nylon material. One such readily available nylon material is marketed under the registered name ZYTEL 101 resin by E. I. du Pont de Nemours & Co., Inc. It should be understood, however, that the material chosen for use may be any suitable thermoresponsive material, i.e., thermoplastic or thermosetting. The mold clamping force used will depend, among other things, on cavity surface areas; internal pressure in the closed cavity; viscosity of the unhardened molding material; and amount of flashing to be tolerated, all of which will be apparent to persons skilled in the art. For example, if a low viscosity material is vacuum drawn into the mold cavity, less mold clamping force would generally be used than in the case of the specific material and cavity pressures identified above.

For ease of description, the mold part 91 has been illustrated as being supported by a fixed base 92. However, the base 92 may be movable and travel in a suitable path to facilitate increased production rates. In addition, plural cavity molds or mold parts may be utilized although a single cavity arrangement has been shown in order to provide a concise description of a preferred embodiment.

As will be observed from the drawings, the stack of laminations essentially "floats" in the closed mold cavity between the stack position determining surfaces 102 and stack accommodating means which include stack clamping pins 103. Thus, the stack 88 is held in the mold cavity by the controlled application of a force thereto through the pins 103. Preferably, this force is substantially independent of the mold closing and holdng force.

The desirability of limiting the amount of force used to compressively urge the stack of laminations against abutment surfaces in the closed cavity will be best appreciated by recalling some characteristics of laminated cores which are used to provide magnetic flux paths in inductive devices.

For example, for a given flux density in a given laminated magnetic core under fixed power input conditions, heat is generated in the core. This phenomenon is one of the observable results of the undesirable characteristic referred to as "core loss". It is known that for a given core construction in a given application, increased mechanical stresses in the laminar structure of the core will generally increase the core loss in that construction. Most magnetic core structures with which I am familiar are annealed in order to relieve stresses within the individual laminations and/or core structure.

For these and other reasons, it would be particularly undesirable to compress the stack 88 with a substantial force, e.g., clamping forces in the magnitude of thousands of pounds, while forming an insulating member in situ on the stack. Accordingly, it is contemplated that if the stack 88 were unduly compressed, permanent deformation of the core structure could result, causing an increase in internal stress and a concomitant increase in core loss.

It is also surmised that an insulating member hardened in situ on a core structure being held under compression by mold closing forces would tend to hold the structure under undue compressive stress after removal from a mold cavity and thereby contribute to increased core losses. Although the actual core loss increase that could result from compressing the lamination stack 88 with a multi-ton mold closing force has not been quantitatively analyzed for the applications described herein, other advantages of providing accommodating means for a lamination stack within a closed cavity will be readily apparent. For example, lamination stacks having a height within a preselected range may have an insulating member formed in situ thereon in accordance with the present invention without resort to the expensive practice of attempting to establish a lamination stack height with close tolerance precision.

Floating of a lamination stack within the illustrated closed cavity will now be more particularly described by having reference again to FIGS. 17 and 18. After the mold parts 91, 93 have been separated to permit placement of a lamination stack on the surface 102, the top mold part 93 moves toward the mold part 91. Just prior to closing of the mold parts, the stack clamping pins 103 compressively urge the stack 88 with a preselected resultant force against the surfaces 102. This resultant preselected force is substantially less than the resultant force with which the mold parts 93, 91 are held against each other.

Figure 18:
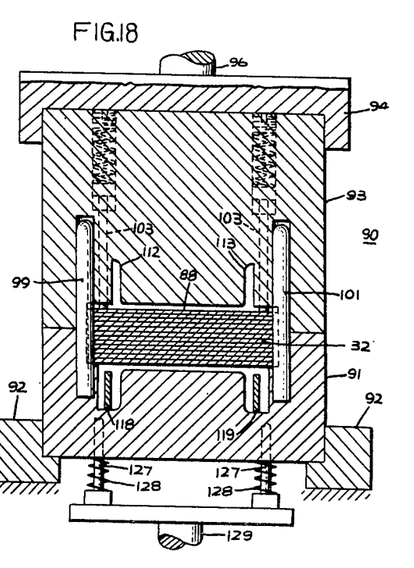
FIG. 18 is a view of the apparatus of FIG. 17 and includes a stack of winding accommodating laminations having a maximum stack height relative to a range of stack heights that may be accommodated by the apparatus.

In the structure shown in FIGS. 17 and 18, the pins 103 are carried through an interconnection permitting lost motion between the pins and upper mold part 93. The pins are held against the lamination stack by springs 104 that are trapped in spring receiving chambers 106 in the upper mold part 93. As the mold part 93 closes on mold part 91 and the pins 103 bear on the lamination stack, the springs are compressed between retaining screws 107 and the spring engaging ends of the pins. Although only two pressure pins 103 are revealed in FIGS. 17–20, four pins are carried by the mold part 93 in the same relative position as the ejection pins 127 shown in FIG. 22.

Thus, the illustrated structure includes pressure relief means interposed between a mold closure force applying member and a stack accommodating means. However, it will be appreciated that magnetic forces or other accommodating means that substantially completely isolate the lamination stack from the mold closing forces may also be utilized.

Lamination stack abutment means have been illustrated as being carried by one mold part and stack height accommodating means carried by another mold part with a lamination stack sandwiched therebetween. However, it will be understood that more than two mold parts may be used and that the abutment means and stack accommodating means may be carried by a single mold part. Furthermore, it will be appreciated that a lamination stack of appropriate configuration could be stacked on edge in a mold part such as the mold part 91 rather than on a lamination surface as shown.

In the apparatus 90, I have found that for nominal stack heights of ½ inch, ¾ ¾ of an inch, and 1 inch, satisfactory results are obtained when the pins 103 are each urged against the lamination stack with a force of approximately 50 pounds per pin. In these cases, even when the mold parts close upon each other with a resultant force of approximately 30 tons, the stack of laminations are compressed with a resultant force of only about 200 pounds and this may be accomplished with mechanical, hydraulic, or air springs.

Figures 19, 20, 21:
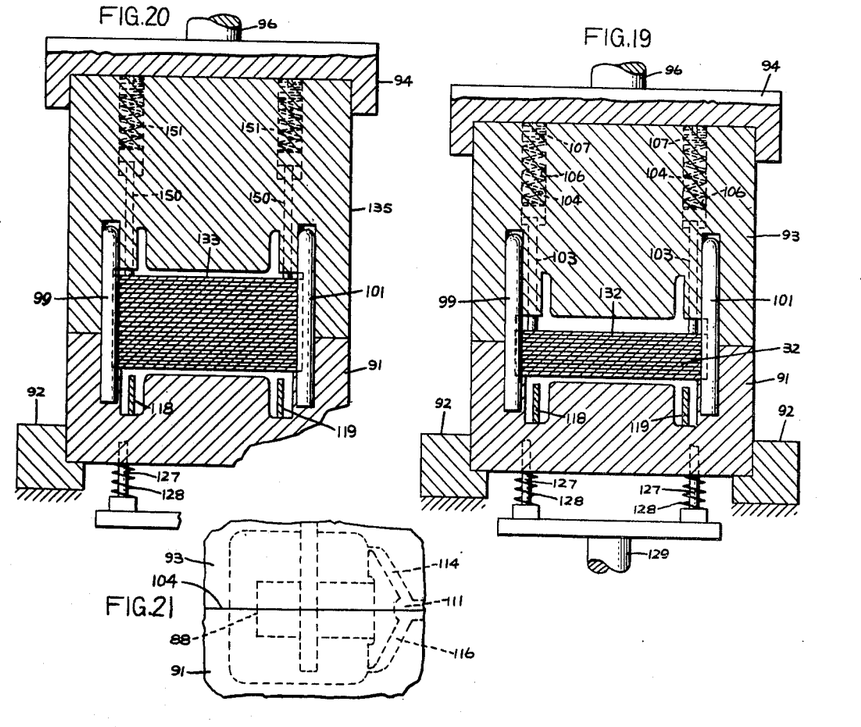
FIG. 19 is a view similar to FIG. 18 and includes a stack of winding accommodating laminations having a stack height less than the stack height illustrated in FIG. 18.
FIG. 20 is a view similar to FIG. 18 but showing modified apparatus that may accommodate laminations with a range of stack heights, the nominal height of which is greater than that which may be accommodated by the apparatus of FIG. 18.
FIG. 21 is a schematic side elevation, with parts broken away, illustrating one arrangement for admitting insulating material to a closed cavity in the apparatus of FIG. 18.
Figure 22:
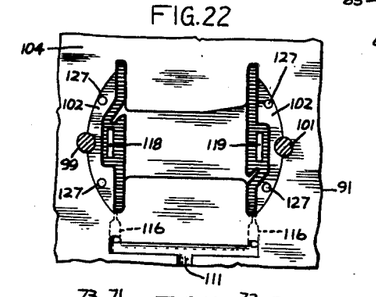
FIG. 22 is a view taken along the lines XXII—XXII in FIG. 17.

FIGS. 21 and 22 illustrate a suitable sprue and runner system that may be used for admitting an unhardened thermoplastic material such as nylon resin to the apparatus 90. With the illustrated arrangement, material is admitted through passageways 111, 114, and 116 to the closed cavity at four spaced apart locations. After the unhardened insulating material has been formed around the stack of laminations 88 (and termination receptacle forming inserts 118, 119 carried by the mold part 91) the insulating material is hardened at least a sufficient amount to permit removal of the lamination stack with an insulating member formed in situ thereon from the mold cavity.

To assist in removal of the insulated structure from the mold, an ejector mechanism may be used. In FIGS. 17–20 and 22, this mechanism is illustrated as including four ejector pins 127. The pins 127 are urged against the bottom lamination in the stack 88 against the bias of a pair of coil spring retractors 128 by an actuator 129 which may be mechanically, hydraulically, or pneumatically operated.

In FIG. 19 there is illustrated the same apparatus 90 as shown in FIGS. 17 and 18. However, in this figure a stack 132 of laminations 32 has been illustrated to reveal accommodation of the apparatus to a stack of laminations having a stack height approximating the minimum stack height in the range of heights to be accommodated.

Recalling the discussion presented previously concerning FIGS. 6 and 7, it will now be understood that when the stack of laminations 32 are positioned in the mold part 91 the pressure pins 103 will hold the laminations against the locating surfaces 102 and a larger cavity will then exist within the upper mold part 93 in FIG. 19 as compared to FIG. 18. However, the pins 103 continue to exert a force of approximately 50 pounds each against the stack 132. The larger FIG. 19 cavity is then filled with insulating material.

It will therefore be understood that one may attain the advantages of the present invention by positioning a stack of laminations having a stack height within a preselected range of stack heights in a mold cavity and locating the stack against an abutment; compressively holding the stack of laminations against the abutment while substantially isolating the laminations from the application thereto of mold closing forces; and forming an insulating member in situ on the stack of laminations with a moldable material.

In FIG. 20, a stack of laminations 133 of approximately twice the stack height of the stack 88 is illustrated. Accordingly, an upper mold part 135 with a deeper cavity therein is used with the mold part 91 in lieu of the mold part 93. The mold part 135 is similar in all respects to the mold part 93 with the exception that the pins 150 are biased against the lamination stack, during formation of an insulating member, with a force of about 200 pounds per pin. This is effected by using relatively stiff springs 151 and has been found to be helpful in preventing an insulated stack 133 from sticking in the mold part 135 when the mold is opened.

Somewhat surprisingly, structures formed by the approach hereinabove described have exhibited improved characteristics as compared with prior structures. One of the more important of these characteristics involves the leakage of current from a winding (e.g., winding 14 in FIG. 1) to ground through a laminated core (e.g., core section 16 in FIG. 1).

In one specific test procedure for determining leakage current, motors similar to the motor 10 shown in FIG. 1 and commercially available competitive motors were tested by first applying a 115 volt, 60 Hz potential across each winding lead and a ground connection that was made by threading a self-tapping screw into the lamination stack of the wound core section. Connected in series between the winding lead and source was a precision one ohm resistor and the voltage drop across the resistor was monitored with a high input impedance voltmeter connected across the resistor. Leakage current levels, in microamperes, were then read directly from the meter. This test set up and the equipment used was very analogous to test procedures and equipment specified by at least one well-known non-profit testing laboratory. Any voltage drop across the precision resistor was read directly from the voltmeter as leakage current from the winding to ground, as will be understood.

All initial tests were made in an air environment at approximately 70°F. and 35% relative humidity. The test units were then placed in a humidity cabinet maintained at 100°F. and 95–100% relative humidity. The units were then removed after 24 hours and the leakage current test repeated in the air environment. After each test, the test units were replaced in the humidity cabinet and additional leakage current tests were made at the end of 3, 7, 9, and 15 days of substantially continuous exposure to 95–100% relative humidity at 100°F.

Only the leakage current readings at the end of 24 hours and 7 days are tabulated below, since the particular devices tested were specifically intended for use in circulating air in the cooling chamber of refrigerators. It was believed that in actual use the tested devices would not probably be exposed to high humidity conditions for periods in excess of 7 days. Furthermore, the data presented below is limited to motors most similar to the motor illustrated in FIG. 1. The competitive motors were provided with a one piece "slip-on" nylon bobbin or spool as described for example in Lilja U.S. Pat. No. 2,010,869.

The minimum thickness of ground insulation separating the motor winding and lamination surfaces in the motors embodying the invention was about 0.032 inches, and it is believed that this was also the minimum thickness of the slip-on bobbins in the competitive motors.

The data from these tests is presented below in Table II which shows the arithmetic average of readings for each test group. Test group A consisted of 11 units embodying the invention; test group B consisted of 16 units embodying the invention; test group C consisted of 10 competitive type motors using one piece nylon slip-on bobbins as insulating members; and test group D consisted of five competitive type motors using one piece slip-on nylon bobbins as insulating members.

Table II

| Test Group | n = number of units in test group | initial 70°F., 35% RH | MICROAMPERES 24 hours at 100°F., 95–100% RH | 7 days at 100°F., 95–100% RH |
|---|---|---|---|---|
| A | 11 | 6.75 | 17.4 | 48.9 |
| B | 16 | 4.17 | 7.87 | 27.6 |
| C | 10 | 5.8 | 19.8 | 238.7 |
| D | 5 | 4.56 | 141.2 | 260* |

*This is an average value for three of the five test units for the indicated test; attempts to measure the leakage current for the other two group D units under these conditions resulted in destruction of 500 microampere protective fuses.

The significance of this data becomes more apparent when it is recalled that the level of human preception of electrical shock, under average conditions, is approximately 200 microamperes, and under special conditions, 50 microamperes.

Thus, it will be appreciated from the data presented in Table II above that after exposure for 24 hours to 100% relative humidity, the test units embodying the invention had an average leakage current value well below the level of perception even under special conditions. However, the average leakage current for the test motors in group D was above the level of perception, at least under special conditions. Some of the more surprising results that are attributed to the present invention are the test results after exposure for 7 days to 95–100% relative humidity. After 7 days, the average leakage current level of units in test groups A and B was still below the level of perception even under special conditions. However, the average values of leakage current for the competitive motors were actually in excess of the level of perception under average conditions. In fact, the leakage current in some of the group D units could not be measured becaused protective fuses were blown.

It is believed that this surprisingly improved characteristic is attributable to the intimacy with which insulation members formed in accordance with the invention engage the surfaces of the laminations in the units embodying the invention. It is also believed to be self-evident that a formed in situ insulating member will result in improved heat dissipation characteristics of an inductive device during operation.

It is emphasized that, by utilizing the teachings presented hereinabove, all of the aforementioned desirable results may be economically and consistently realized even though the actual height of the cores to be insulated is inexact. The term "inexact" is herein used to identify actual stack heights within a predetermined range of stack heights.

It is again noted that a generally acceptable variance in actual stack height (from core to core and for cores of a given nominal stack height) is two lamination thicknesses. For example, for a core made up of nominally 0.025 inch thick laminations and having a nominal stack height of 0.500 inch, the nominal number of laminations in the stack would be 20 laminations. However, low carbon content lamination steel from which laminations are made typically varies in thickness across the width of the strip stock. In addition, thickness variations may be encountered along the length of such strip stock. Thus, each lamination may vary slightly in thickness from one portion thereof to another. In addition, some variations in thickness may also be encountered from one coil of strip stock to another. As a result of this, laminations formed from such material may vary, at least slightly, from one to another.

These variations alone may result in a measurable difference in stack height between two cores that are each made up of a given number of stacked laminations, as well as in a difference in stack height along spaced apart portions of a single core. Variations in thickness of individual laminations may also be caused by the presence, in varying degrees, of burrs along the edges of individual laminations or by layers of oxides or other materials on lamination surfaces. Any of these lamination variations may then cumulatively result in variations in the stack height of cores comprised of such laminations.

Variations in actual stack height may also result because of the difficulty or expense associated with grouping together an exact number of laminations to form a core of a nominal stack height in actual practice. For example, it generally is not feasible to manually count each of a group of laminations needed for a core having a nominal stack height. In fact, a practice of this type could be questionable since, even if an exact nominal member of laminations were assembled, the actual height of the stack might be excessive because of a cumulative build-up of variations in the thickness of individual laminations. For the above and other reasons, a more acceptable practical approach when making a core of a nominal stack height is to merely select a group of laminations that have a stack height within a predetermined range. This predetermined range may be, for example, a range from a nominal stack height minus the nominal thickness of one lamination, to a nominal stack height plus the nominal thickness of one lamination.

If one desired to make use of conventional equipment and processes for forming insulation in situ on a core of inexact stack height, it would be necessary to machine the core so that it would have a uniform stack height in order to avoid damage to the molding equipment or to avoid undesirable excessive compression of the core by the molding equipment. An alternative but objectionably expensive approach would be to form a precision casting about a laminated stack and seal the mold parts against the casting so as to prevent the escape of unhardened insulating material from the mold cavity.

The approach just mentioned would be expected to be disadvantageous for reasons other than cost. For example, positioning windings on such an encased core would be expected to be difficult, and the mass of the casting would need to be handled during numerous manufacturing operations.

Having reference now to FIGS. 23–26, motors, transformers, or other inductive devices constructed to embody my invention may readily be formed as substantially waterproof structures. Whether of the waterproof variety or not, such devices also may be of the "leadless" type. When leadless, external lead wires may be readily assembled with electrical termination members supported on the device or power supply lead connections may be made with connectors of the quick connect or quick disconnect type.

Figure 23:
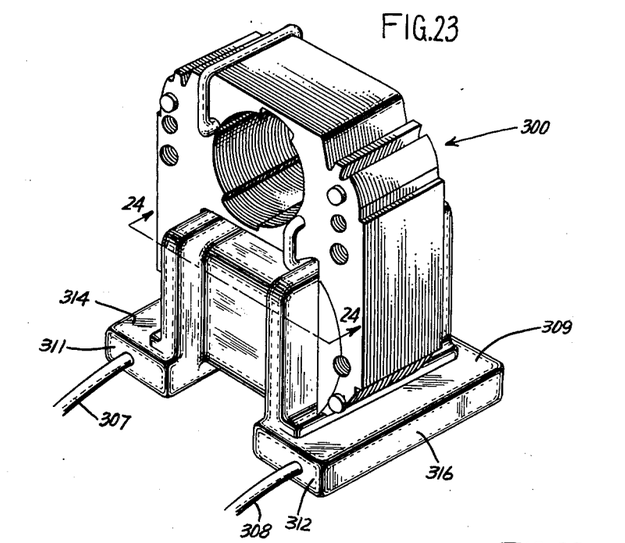
FIG. 23 is a perspective view, with parts removed, of a motor embodying the invention in another form.
Figure 24:
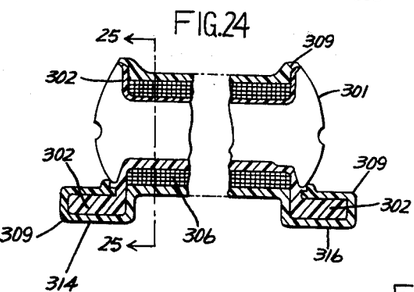
FIG. 24 is a view in cross-section, with parts broken away, of a portion of the structure shown in FIG. 23.
Figure 25:
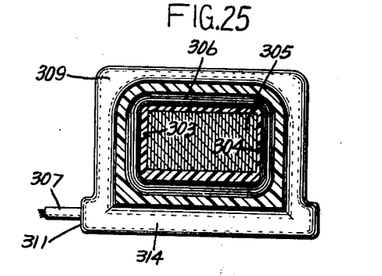
FIG. 25 is a view taken in the direction of the arrows 25—25 in FIG. 24, assuming the structure of FIG. 24 to be shown in full.

In FIG. 23 I have shown a motor 300 that is substantially waterproof. For simplicity of illustration, the rotor, bearing means, and bearing supporting means have been omitted. However it will be understood that the complete motor 300 would include all of the omitted structure.

In the manufacture of the motor 300, a stack 301 of winding accommodating laminations 305 is initially provided with a molded in situ insulating body 302. The body 302 may be provided in the manner described hereinabove in connection with FIGS. 3 through 22. It will be noted from FIG. 25 that the portion 303 of the molded in situ insulating body 302 is thicker than the portion 304 because the height of stack 301 is less than a predetermined maximum permissible stack height.

After formation of the molded in situ insulating body 302, a plurality of winding turns 306 are wound about the insulated core. A not shown soldered, brazed or crimp connection then is made between the ends of the coil and each of the external lead wires 307, 308. Thereafter, the insulated and wound laminated core is positioned in a second mold cavity, and insulating material is molded thereabout to provide an outer sealing casing 309. This outer casing 309 preferably is formed from the same nylon material as the inner insulating body 302. Molding may then be accomplished at about 500°F. However, other materials and temperatures may be used if desired.

Apparently as the result of the shrinkage of the body 309 as it cooled from its softened state to its hardened state a moisture and liquid resisting seal between body 302 and 309 was formed. It is not believed, however, that any heat welding occurred along the interface of the molded in situ insulation 302 and the insulating material forming the body 309.

The leads 307 and 308 have been illustrated as exiting from the faces 311 and 312 of casing 309, but it will be understood that leads could emanate from other surfaces of the bases 314 and 316 if desired. The bases 314, 316 also provide a unique advantage in that the insulating and sealing structure 309 may be utilized for the purpose of supporting the motor 300 after final assembly thereof. In addition, fastening means such as mounting holes or hook like projections (such as those shown for example in Wendt U.S. Pat. No. 3,500,087) may be provided along the bases 314 and 316 to facilitate mounting the motor 300 in apparatus in which the motor 300 is to be utilized.

The motor 300 is of particular value for use in environments where added protection against liquids or greases is desired. For example, the motor 300 can be applied as the powering means for aquarium or swimming pool pumps, or for range hood fans.

Figure 26:
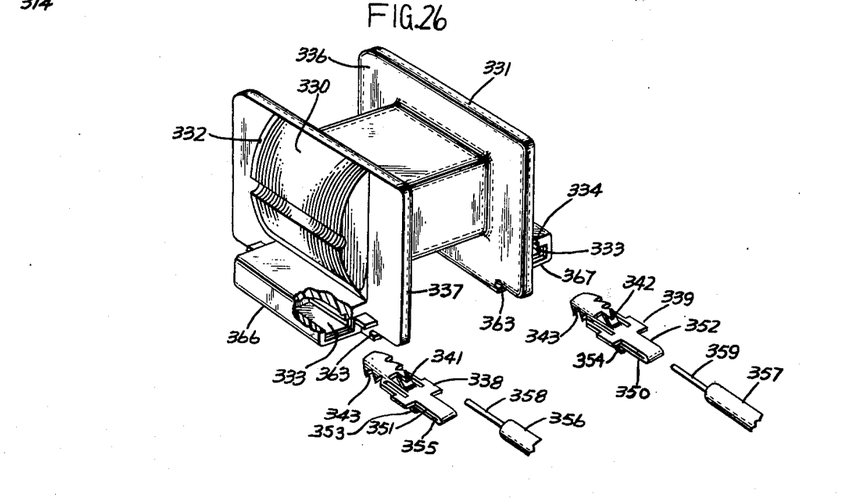
FIG. 26 is a view in perspective, with parts in exploded relationship, of an insulated structure constructed according to another aspect of the invention.

FIG. 26 shows still another exemplification and illustrates a leadless type of construction. In FIG. 26, windings have been omitted for purposes of clarity, but a stack 330 of laminations having a molded in situ insulating body 331 formed thereon is clearly revealed. It will be noted that a relatively thick portion 332 of insulation is adjacent one end face of the stack 330, this portion 332 compensating for a less than maximum height of the stack 330.

The insulating body 331 is provided with a plurality of termination or terminal receiving sockets 333. Each of the sockets 333 include a passageway 334. After windings have been disposed within the winding retaining flanges 336, 337 of the insulating body 331, the quick connect type terminals 338, 339 are positioned in each one of the sockets 333. At this time, the tangs 341, 342 are received in a channel 334 adjacent each of the sockets.

Striations or barbs 343 on each of the terminals prevent inadvertent removal of the terminals from the sockets 333 after assembly. Once the terminals 338, 339 have been assembled, i.e., positioned in the insulating body, the ends of the not shown winding are hooked or snagged on a lead retainer like retainer 363. The extremity of the winding lead or end then is wrapped about the ends 351, 352 of terminals 338, 339. Thereafter, the extremities or tabs 353, 354 are bent upon the wires and the connection is secured by heat staking, soldering, or brazing. When assembled as described to this point, a leadless type construction will have resulted.

Figure 27:
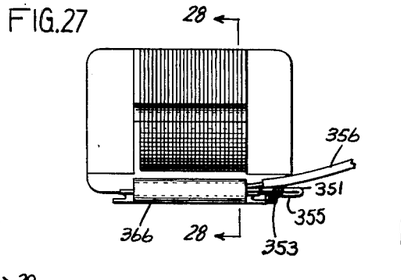
FIG. 27 is an end elevation of the structure shown in FIG. 26.
Figure 29:
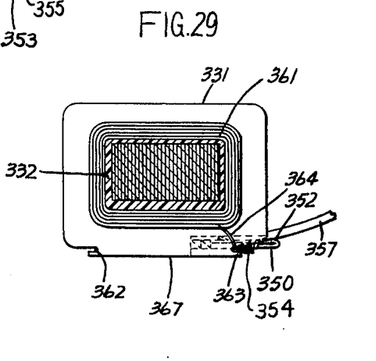
FIG. 29 is a cross-sectional view taken in the direction of arrows 29—29 in FIG. 27, assuming FIG. 27 to be a full view.

As clearly revealed in FIGS. 26, 27, and 29, each end 351, 352 of the terminals is formed by folding portions 355, 350 respectively, of the terminal material and by providing the tangs or tabs 353, 354 as shown. Preferably, the final dimensions of the ends 351, 352 of the terminals will conform to standard dimensions for male terminals of the chosen nominal size.

When the terminals 338, 339 are to be used to interfit with standard female quick connect terminals adapted to receive standard ¼ inch male terminals, the terminals 338, 339 will be formed of 0.016 inch thick stock. When this is done, the total thickness of each terminal will be 0.032 of an inch thick. The width of the free extremities or spade type ends of the terminals 338, 339 (for ¼ inch terminal designs) will be 0.250 of an inch.

External lead wires having female quick connect terminations may subsequently be connected to the not shown windings by snapping the terminations thereof to the spade type projecting ends 351, 352 of the terminals 338, 339. Alternatively, stripped and tinned conductors 358, 359 of external lead wires 356, 357 may be directly inserted into channels 34 so that electrical connections may be made with tangs 341, 342. During this assembly procedure, tangs 341, 342 yield to permit axial movement therepast of conductor ends 358, 359, while also making good electrical contact with the conductor ends. Any attempt to withdraw the lead wires 356, 357 will cause the tangs 341, 342 to even more tightly grip the conductor ends with a wedging action and thus prevent removal of the lead wires.

Figure 28:
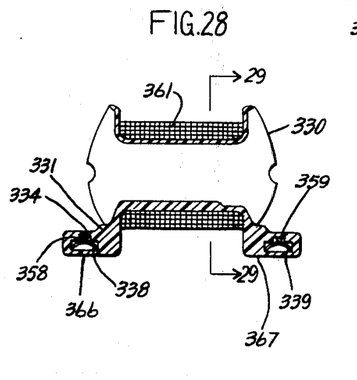
FIG. 28 is a view in cross-section, taken in the direction of the arrows 28—28 in FIG. 27.

FIGS. 27–29 are views of the same structure as shown in FIG. 26 with the exception that the winding 361 also has been illustrated. This winding may be copper or aluminum wire or any other suitable shape or form of conductor. Of these views, FIG. 29 most clearly reveals the projections 362, 363 which insure the proper positioning of winding leads 364. Each of FIGS. 26–29 clearly reveal supporting pads or feet 366, 367, that are formed as part of the insulating body 331.

Figure 30:
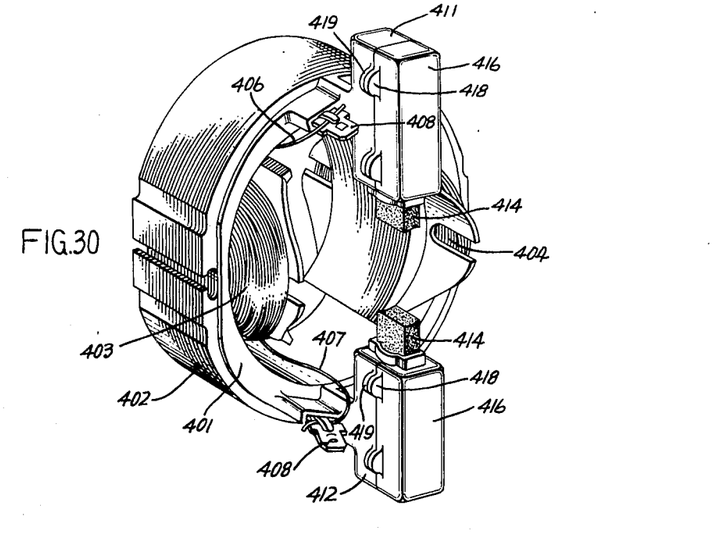
FIG. 30 is a view in perspective of an electric motor stator assembly embodying the invention in still another form.

In FIG. 30, I have illustrated the stator 400 of a salient-pole series wound type of motor. A molded in situ insulating body 401 is formed on the laminated core 402 in accordance with the teachings presented hereinabove, and winding turns 403, 404, are accommodated adjacent to the insulating body. The winding leads 406, 407, are connected to quick connect terminals 408 that are received in terminal accommodating sockets that are molded in the insulating body 401.

The insulating body is also molded to include at least parts 411, 412 of brush mounting members. After brushes 414 have been placed as desired, covers 416 are assembled to the members 411, 412 by ultrasonically welding the ears 418, 419 together or by any other desired mode of assembly. The shunts or leads for the brushes 414 may then be brought out through openings in the brush mounting structure. Alternatively, the brush leads may be molded in the brush mounting structure and subsequently connected, all as will be understood by persons of ordinary skill in the art.

From all of the foregoing, it should now be appreciated that all of the above stated objects of the invention may be readily accomplished. Accordingly, while the present invention has been described with reference to particular embodiments and exemplifications thereof, it is to be understood that modifications may be made by those skilled in the art without departing from the invention. Therefore, I intend in the appended claims to cover all such equivalent variations as come within the true spirit and scope of the invention.

What I claim as new and desire to secure by Letters Patent of the United States is:

1. An insulated magnetizeable laminated core assembly for use in a dynamoelectric machine having a stator and rotor; the insulated core assembly comprising a plurality of magnetizeable laminations arranged in a stack having an actual stack height within a preselected range; and a molded in situ body of insulation supported on the stack of magnetizeable laminations; said molded in situ body of insulation having a portion along one surface of the stack of laminations with a first thickness, and at least one other portion having a thickness greater than the first thickness by an amount that is dependent on the actual stack height.

2. The structure of claim 1 wherein the molded in situ body of insulation includes at least one portion for accommodating an electrically conductive brush.

3. The structure of claim 1 wherein the insulated core assembly includes a plurality of stator winding turns and a mass of insulation molded in place over the windings, to thereby form a substantially fluid resistant protective covering for the stator winding turns.

4. The structure of claim 1 wherein the molded in situ body of insulation includes two spaced apart surface portions that project from the stack of laminations for supporting the core assembly.

5. The structure of claim 4 wherein the molded in situ body of insulation further includes means for mounting the core assembly to a motor supporting structure.

6. An insulated core assembly as set forth in claim 1 wherein the molded in situ body of insulation includes at least one receptacle for receiving electrically conductive termination means.

7. The structure of claim 6 wherein the insulated core assembly further includes at least one terminal disposed in the at least one receptacle, said at least one terminal having lead wire engaging means for permitting movement of lead wires therepast in a first direction and substantially preventing movement of the lead wires in a direction opposite to the first direction.

8. An insulated magnetizable laminated core assembly for use in a dynamoelectric machine having a stator and rotor; the insulated core assembly comprising a plurality of magnetizable laminations arranged in a stack having an actual stack height within a preselected range and a molded in situ body of insulation supported on the stack of magnetizable laminations; said molded in situ body of insulation including a portion along one surface of the stack of laminations with a first thickness, at least one other portion having a thickness greater than the first thickness by an amount that is dependent on the actual stack height, and also including at least one receptacle for receiving electrically conductive termination means; said insulated core assembly further comprising at least one terminal disposed in the at least one receptacle with the at least one terminal including lead wire engaging means for permitting movement of lead wires therepast in a first direction and substantially preventing movement of the lead wires in a direction opposite to the first direction, and also including a portion adapted for interconnection with a quick connect terminated lead wire; said portion of said at least one terminal being a quick connect type spade type termination.

9. An insulated core assembly for use in a dynamoelectric machine having a stator and rotor; the insulated stator core assembly comprising a plurality of magnetizeable laminations arranged in a stack having an actual stack height, a molded in situ body of insulation supported on the stack of magnetizeable laminations; said molded in situ body of insulation having a first portion along one surface of the stack of laminations with a first thickness and a second portion along another surface of the stack of laminations with a second thickness that is measurably greater than the first thickness; a plurality of stator winding turns supported adjacent to selected regions of the first molded in situ body of insulation; and a second body of insulation disposed over the winding turns and in sealing relationship with at least part of the molded in situ body of insulation whereby the stator winding turns are substantially encased by insulating material.

10. A dynamoelectric machine comprising a stack of winding accommodating magnetizeable stator laminations arranged in a stack having an actual stack height within a preselected range of stack heights; a body of insulating material molded in situ on the stack of winding accommodating magnetizeable stator laminations; and a plurality of winding turns supported adjacent to preselected regions of the molded body of insulating material; said body of insulation including a ground insulation section intimately engaging selected surfaces of the stack of winding accommodating laminations; one portion of the ground insulation section having a predetermined first thickness and at least one other portion of the ground insulation section having a second thickness that is measurably greater than the first thickness; said second thickness being determined during the process of molding the body of insulation.

11. A laminated magnetizeable winding support comprising a stack of winding accommodating laminations and a body of insulation intimately engaging selected surfaces of the stack of laminations to provide a covering over said selected surfaces; said winding support having a preselected overall height and said winding accommodating laminations having an actual stack height within a predetermined range of stack heights; said body of insulation including a molded member formed in situ on the stack of winding accommodating laminations; said molded member having a first wall molded in a predetermined configuration adjacent to a first surface of the stack of laminations with the first wall having a preselected first thickness along a given line of measurement; said molded member having a second wall with an actual thickness along the given line of measurement greater than the first thickness and substantially equal to a preselected minimum thickness plus the difference between the maximum stack height in the predetermined range of stack heights and the actual stack height of the winding accommodating laminations.

12. The structure of claim 11 wherein the body of insulation secures the stack of winding accommodating laminations together.

13. A laminated magnetizable winding support comprising a stack of winding accommodating laminations and a body of insulation intimately engaging selected surfaces of the stack of laminations to provide a covering over said selected surfaces; said winding support having a preselected overall height and said winding accommodating laminations having an actual stack height within a predetermined range of stack heights; said body of insulation including a molded member formed in situ on the stack of winding accommodating laminations; said molded member having a first wall molded in a predetermined configuration adjacent to a first surface of the stack of laminations with the first wall having a preselected first thickness along a given line of measurement; said molded member having a second wall with an actual thickness along the given line of measurement greater than the first thickness and substantially equal to a preselected minimum thickness plus the difference between the maximum stack height in the predetermined range of stack heights and the actual stack height of the winding accommodating laminations; and said body of insulation comprising a bobbin having a pair of winding retaining sideboards formed in situ on the stack of winding accommodating laminations.

* * * * *